US012513587B2

(12) United States Patent
Polaganga et al.

(10) Patent No.: US 12,513,587 B2
(45) Date of Patent: Dec. 30, 2025

(54) DYNAMIC VOICE OVER NEW RADIO SWITCHING IN NEW RADIO CARRIER AGGREGATION SCENARIOS

(71) Applicant: T-MOBILE INNOVATIONS LLC, Overland Park, KS (US)

(72) Inventors: Roopesh Kumar Polaganga, Bothell, WA (US); Amembal Vikram Pai, Bothell, WA (US); Ramesh Venkata Josyula, Redmond, WA (US); Nishant Patel, Irvine, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 390 days.

(21) Appl. No.: 18/109,111

(22) Filed: Feb. 13, 2023

(65) Prior Publication Data
US 2024/0276332 A1 Aug. 15, 2024

(51) Int. Cl.
*H04W 36/14* (2009.01)
*H04W 36/26* (2009.01)
*H04W 36/30* (2009.01)

(52) U.S. Cl.
CPC .......... *H04W 36/14* (2013.01); *H04W 36/26* (2013.01); *H04W 36/30* (2013.01)

(58) Field of Classification Search
None
See application file for complete search history.

(56) References Cited

U.S. PATENT DOCUMENTS

| | | | |
|---|---|---|---|
| 11,310,867 B2* | 4/2022 | Shi | H04L 5/0053 |
| 12,160,876 B2* | 12/2024 | Takeda | H04L 5/001 |
| 2014/0204866 A1* | 7/2014 | Siomina | H04W 28/04 370/329 |
| 2020/0275259 A1* | 8/2020 | Zhu | H04L 65/1095 |
| 2022/0322178 A1* | 10/2022 | Hathiramani | H04W 36/30 |
| 2023/0047375 A1* | 2/2023 | Zacharias | H04W 56/0015 |

* cited by examiner

*Primary Examiner* — Xavier S Wong
(74) *Attorney, Agent, or Firm* — SHOOK, HARDY & BACON L.L.P.

(57) ABSTRACT

Systems and method are provided for dynamic VoNR switching in NRCA scenarios. A user is conducting a VoNR call on a primary cell with the radio quality determined with respect to an operator defined threshold based on monitoring the radio quality of the call for a predetermined time duration. Voice quality may degrade, so radio quality is compared with at least one configured secondary cell using at least one operator defined radio condition. The radio condition may be a mean opinion score (MOS), or may be an RF signal quality measurement. The comparison between the primary cell and the secondary cell reveals if at least one of the configured secondary cells exceeds at least one operator defined radio condition. The UE may be dynamically instructed to transfer from the current serving primary cell to the at least one configured secondary cell that exceeds at least one operator defined radio condition.

20 Claims, 7 Drawing Sheets

DYNAMIC VOICE OVER NEW RADIO SWITCHING IN NEW RADIO CARRIER AGGREGATION SCENARIOS

BACKGROUND

Wireless telecommunications networks, such as 5G and LTE networks are standardized to facilitate aggregation of multiple carrier combinations in order to provide higher data speeds and throughput to the user equipment (UE) of end users. Ideally, serving carriers used for carrier aggregation at a cellular site cover overlapping geographical areas with multiple frequency combinations so that carrier aggregation capable UEs in such locations can use multiple serving carriers and take advantage of the resulting enhanced data throughput. The primary cell is where the UE makes the initial network connection and establishes uplink (UL) and downlink (DL) signaling and data flow, in both guaranteed bit rate (GBR) and non-guaranteed bit rate (Non-GBR). Subsequently, secondary cells may be added in both UL and DL with new radio carrier aggregation (NRCA). GBR applications, such as voice service, are established using the primary cell, even when there is an active secondary cell in both UL and DL. In NRCA and voice over new radio (VoNR) poor performance of VoNR is contained in the primary cell and the gNB does not take into account a secondary cell that may be able to provide better service if a switch to the secondary cell could be made. The result is voice interruptions, poor service, and dissatisfied customers.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In some embodiments, solutions are provided that address the problem of providing dynamic VoNR switching in NRCA scenarios. A user is conducting a VoNR call on a primary cell with the radio quality determined with respect to an operator defined threshold. The operator defined threshold is based on monitoring the radio quality of the call for a predetermined time duration. During the call, radio quality may degrade, so radio quality is then compared with at least one configured secondary cell using at least one operator defined radio condition. The radio condition may be a mean opinion score (MOS), or may be an RF signal quality measurement. The comparison between the primary cell and the secondary cell reveals if at least one of the configured secondary cells exceeds at least one operator defined radio condition. Based on the determination, the UE may be dynamically instructed to transfer from the current serving primary cell to the at least one configured secondary cell that exceeds at least one operator defined radio condition.

DL secondary cells may also be determined. The UL NRCA and initial DL NRCA frequency combinations are determined. Next, the UL NRCA frequency combination used by the UE is evaluated to determine if the UL NRCA frequency combination is a subset of the already configured DL NRCA frequency combinations. The effective bandwidth of DL NRCA frequency combinations that are a subset of configured DL NRCA frequency combinations is then compared and, if the effective bandwidth difference is less than a predetermined operator configured threshold, the configured secondary cell may be used by the UE.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
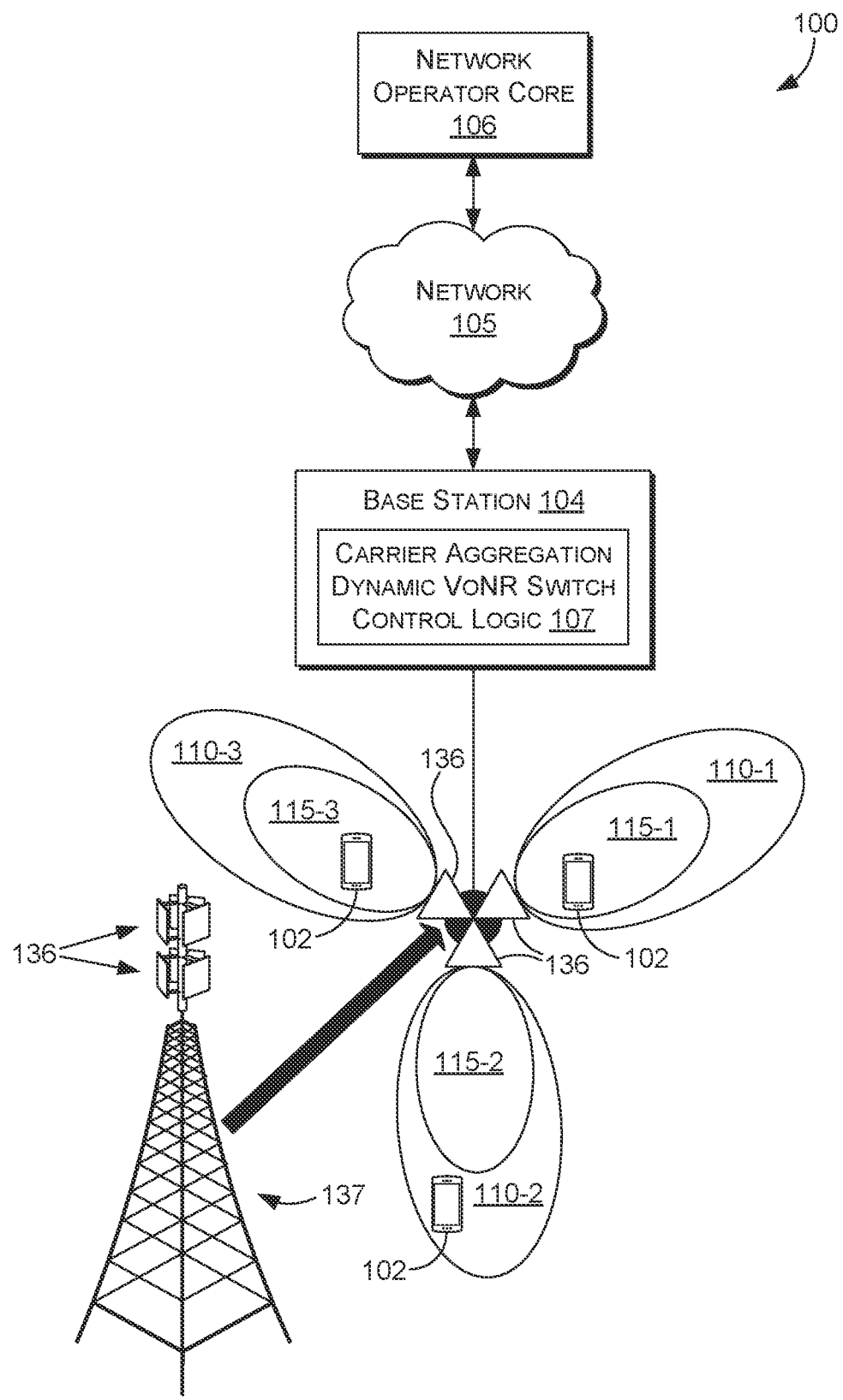
FIGS. 1 and 1A are diagrams illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Carrier Aggregation (CA) is a provision of 5G and LTE standards that enables wireless operators to combine distinct carrier channels from a primary serving cell (P-cell) and at least one secondary serving cell (S-cell) into a single data channel to obtain higher data rates with mobile user equipment (UE). In general, for a UE to benefit from carrier aggregation, the UE is located within an overlapped area of cell boundaries that includes coverage from a primary serving cell operating via a primary component carrier (e.g. at carrier frequency, $f_1$), and a secondary serving cell operating via a second component carrier (e.g. at carrier frequency, $f_2$). The primary component carrier and second component carrier can either be within the same frequency band (e.g., both carriers in band N41) or within different frequency bands (e.g., one carrier in band N41 and the other in band N71). It should also be understood that primary component carrier and second component carrier can both implement the same duplexing scheme (e.g., both frequency division duplexing (FDD) and time division duplexing (TDD)), or different duplexing schemes (e.g., a combination of FDD and TDD).

The use of carrier aggregation improves data rates for UE by increasing the overall bandwidth of the logical channels available to the UE to send and/or receive data to the network operator core. At present, DL NRCA is being used to provide high DL speeds to 5G users. With technology evolution, UL NRCA is being introduced to provide high uplink speeds. Initially, only certain UL NRCA frequency combinations will be supported, however, subsequent chipsets and devices will support more frequency combinations to accommodate more operators and their spectrum holdings. The UL NRCA frequency combinations are preferably a subset of the DL NRCA frequency combinations to be supported by the device to provide standardization and implementation feasibility. Careful consideration of frequency combinations is needed to ensure that primary and secondary cells are available for UEs among the available candidate layers.

One or more of the aspects of the present disclosure provide for, among other things, solutions that address the problem of providing dynamic VoNR switching in NRCA scenarios. The method begins with measuring radio quality for a VoNR call on a primary cell, with radio quality determined with respect to an operator defined threshold based on monitoring for a predetermined time duration. The measured radio quality is then compared with the radio quality on at least one configured secondary cell for the VoNR call. The comparison is made based on at least one operator defined radio condition. Then, based on the determining, the VoNR call is transferred from the primary cell to the at least one configured secondary cell that exceeds at least one operator defined radio condition.

An additional aspect of the present disclosure provides a method of dynamic VoNR switching in NRCA operations. A UE is involved in a VoNR call using a primary cell. During the VoNR call radio quality is measured with respect to an operator defined threshold. The VoNR is monitored for a predetermined time duration. Based on the monitoring, the UE receives an instruction to move from a current serving primary cell to a configured secondary cell.

A still further aspect of the present disclosure provides a non-transitory computer storage media storing computer-useable instructions that, when used by one or more processors, cause the processors to measure radio quality for a VoNR call occurring on a primary cell. The radio quality of the VoNR call is determined with respect to an operator defined threshold and is based on monitoring the VoNR call for a predetermined time duration. The radio quality of the VoNR call on the primary cell is then compared with the radio quality on at least one secondary cell. The processors then determine if at least one configured secondary cell exceeds at least one operator defined radio condition. Based on the determination, the VoNR may be switched from the current serving primary cell to the at least one configured secondary cell.

In NRCA the primary cell is where the UE performs the initial connection to the network and establishes UL and DL signaling and data flows, for both Non-GBR and GBR data flows. Subsequent secondary cells may be added for both UL and DL using UL NRCA and DL NRCA. These secondary cells may carry non-GBR data and do not carry GBR or signaling data. Both UL NRCA and DL NRCA may coexist simultaneously and the UL NRCA combination may be the same or a subset of the DL NRCA combination being used. Despite the availability of a secondary cell, in some applications, in particular, voice and GBR applications, are established using a primary cell only.

In simultaneous NRCA and VoNR scenarios any poor performance of VONR occurs in the primary cell UL and DL and the gNB does not take advantage of the possibility of using a secondary cell in place of the poorly performing primary cell. There is good visibility of the secondary cell's radio and load conditions, which may provide an opportunity to switch voice service to the symmetrical secondary cell if performance of the primary cell warrants dynamic switching. Dynamically switching to the secondary cell may minimize voice service interruptions with no need for additional signaling on the higher radio resource control (RRC) layers. Switching to the secondary cell incurs only minimal data interruptions.

FIG. 1 is a diagram illustrating an example network environment 100 embodiment in which aspects of dynamic carrier aggregation configuration management, including carrier aggregation UL aware control logic, may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises a network operator core 106 that provides one or more wireless network services to one or more UEs 102 via a base station 104, often referred to as a radio access network (RAN). In the context of fourth generation (4G) Longer Term Evolution (LTE), the base station 104 may be referred to as an eNodeB, or eNB. In the context of fifth generation (5G) New Radio (NR), the base station 104 may be referred to as a gNodeB, or gNB. Other terminology may also be used depending on the specific implementation technology. In particular, each UE 102 communicates with the network operator core 106 via the base station 104 over one or both of uplink (UL) radio frequency (RF) signals and downlink (DL) RF signals. The base station 104 may be coupled to the network operator core 106 by a backhaul network 105 that comprises wired and/or wireless network connections that may include wireless relays and/or repeaters. In some embodiments, the base station 104 is coupled to the network operator core 106 at least in part by the Internet or other public network infrastructure. The network environment 100 is configured for wirelessly connecting UEs 102 to other UEs 102 via the same base station 104, via other base stations, or via other telecommunication networks such as backhaul network 105 or a publicly-switched telecommunication network (PSTN), for example. Generally, each UE 102 is a device capable of unidirectional or bidirectional communication with radio units (also often referred to as radio points or wireless access points) of the base station 104 using RF waves.

As illustrated in FIG. 1, the base station 104 radiates and receives RF signals via one or more directional antennas 136 that each serve UE 102 that are located within a geographic area referred to as a cell or sector. The specific size, shape and orientation of a cell is a function, at least in part, on the design and azimuth (tilt) of each of the several antennas 136, and the carrier frequency of the carrier serving that cell. In the particular embodiment illustrated in FIG. 1, base station 104 forms six cells (or sectors) each via a respective antenna 136 mounted to a site tower 137. In other embodiments, a few or greater number of cells may be formed.

Cells 110-1, 110-2 and 110-3 operate at a first carrier frequency, $f_1$, and cells 115-1, 115-2 and 115-3 operate at a second carrier frequency, $f_2$. In some embodiments, carrier frequency, $f_1$, is a low-band frequency and carrier frequency, $f_2$, is a high- or mid-band frequency so that cells 115-1, 115-2 and 115-3 each cover relatively smaller geographic areas than cells 110-1, 110-2 and 110-3. In this example, when a UE 102 initializes communications with the base station 104, it is allocated one or more resource blocks available on carrier frequency, $f_1$, so that carrier frequency, $f_1$, is the primary component carrier for that UE 102. Depending on its physical location, one of the cells 110-1, 110-2 and 110-3 therefore serves as the primary serving cell for that UE 102. The cells 115-1, 115-2 and 115-3 operating with the carrier frequency, $f_2$, are each potential secondary serving cells for the secondary component carrier that may be used in combination with cells 110-1, 110-2 and 110-3 to implement carrier aggregation for UE 102.

As previously explained, secondary cell activation for a UE 102 is available when the UE 102 is located within an overlapping region of a primary serving cell and a secondary serving cell, and those primary and secondary serving cells are specifically related to each other by the base station 104 for purposes of carrier aggregation in UL or DL.

Figure 1A:
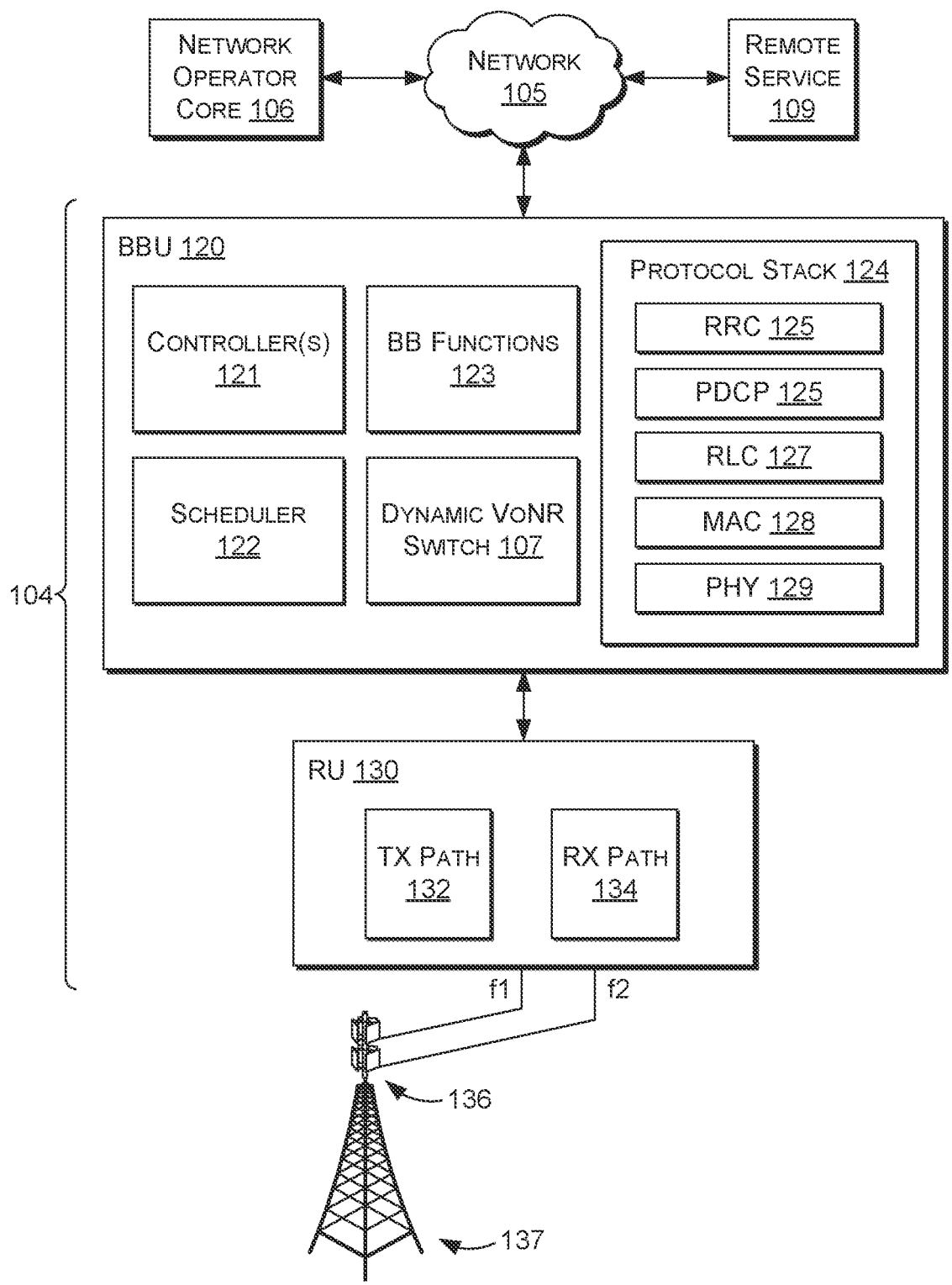

Referring now to FIG. 1A, FIG. 1A illustrates a base station 104 comprising a baseband unit (BBU) 120 coupled to a least one Radio Unit (RU) 130 through which the base station 104 serves a coverage area that comprises the cells 110-1, 110-2 and 110-3 and cells 115-1, 115-2 and 115-3 (shown in FIG. 1). The BBU 120 comprises the circuitry and functionality to implement an air interface and Open System Interconnection (OSI) Layer 1, Layer 2 and Layer 3 functions for the air interface. The RU 130 includes a radio head comprising transmit (TX) path 132 that includes radio transmitter circuitry (such digital-to-analog converters, one or more RF filters, frequency up-converters, and/or a Power Amplifier (PA)) and receive path (RX) 134 that includes radio receiver circuitry (such analog-to-digital converters, one or more RF filters, frequency down converters, and/or a Low Noise Amplifier (LNA).) The TX path 132 and RX path 134 may be coupled to the plurality of antenna 136 by an appropriate coupler (such as a duplexer, for example). The antennas 136 may be physically mounted to a site tower 137 or other structure (such as a building, for example). Downlink RF signals are radiated into the coverage area via TX path 132 and antenna 136 for reception by the UEs 102. Uplink RF signals transmitted by the UEs 102 are received via the antenna 136 and RX path 134. The base station 104 may communicate with the UE 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the base station 104 may optionally support multiple air interfaces and/or multiple wireless operators.

The network environment 100 and base station 104 are generally configured for wirelessly connecting UE 102 to data or services that may be accessible on one or more application servers or other functions, nodes, or servers (such as a remote service 109, for example). In some implementations, the remote service 109 serves as the originating server or servers for operating data (such as environmental data, traffic condition data, navigation and/or other operating commands) delivered to the UE 102 and/or utilized for operation of the UE 102.

It should be understood that in some aspects, the network environment 100 shown in FIGS. 1 and 1A may implement one or more features of the network operator core 106 within other portions of the network, or may not implement them at all, depending on various carrier preferences.

As depicted in FIG. 1A, the BBU 120 may comprise one or more controllers 121 comprising a processor coupled to a memory and programed to perform one or more of the functions of the BBU 120 described herein. In some embodiments, the base station functions described herein may be executed by one or more controllers in a distributed manner utilizing one or more network functions orchestrated or otherwise configured to execute utilizing processors and memory of the one or more controllers. For example, where base station 104 comprises a gNodeB, the functions of the BBU 120 may be distributed between functional units comprising a Centralized Unit (CU) and at least one Distributed Unit (DU). As such, one or more functions of the base station described herein may be implemented by discrete physical devices or via virtual network functions.

The BBU 120 is responsible for, among other things, digital baseband signal processing, for example to process uplink and downlink baseband signals, shown in FIG. 1A as Baseband (BB) function(s) 123. The BBU 120 further includes a scheduler 122 through which the BBU 120 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 122 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink and downlink communications traffic between the BBU 120 and UE 102 are processed through a protocol stack 124 implemented by the BBU 120 that comprises various protocol stack layers. In the example embodiment illustrated in FIG. 1A, the protocol stack 124 includes a radio resource control (RRC) layer 125, packet data convergence protocol (PDCP) layer 126, radio link control (RLC) layer 127, medium access control (MAC) layer 128, and physical layer (PHY) 129. In some embodiments, the implementation of carrier aggregation is performed at least in part by the RRC layer 125 and MAC layer 128.

The MAC layer 128 is responsible, for example, for mapping between logical channels of the RLC layer 127 and transport channels of the PHY layer 129. MAC layer 128 may also perform functions such as, but not limited to, multiplexing of MAC service data units (SDUs) from logical channels onto transport blocks (TB) to be delivered to the PHY layer 129 on transport channels, de-multiplexing of MAC SDUs from one or different logical channels from transport blocks (TB) delivered from the PHY layer 129 on transport channels, scheduling information reporting, error correction through hybrid automatic repeat requests (HARQ), priority handling between UEs by means of dynamic scheduling, priority handling between logical channels of one UE, and logical channel prioritization.

In some embodiments, MAC layer 128 manages multiplexing and demultiplexing of data across a primary component carrier and secondary component carriers when carrier activation is activated. For example, MAC layer 128 distributes data from each logical channel across the primary and secondary component carriers of serving cells identified to the MAC layer 128 (by dynamic VoNR switch 107, for example) as related for carrier aggregation purposes. Logical channels, are multiplexed to form transport blocks for each component carrier with each component carrier. When carrier aggregation is activated, a primary component carrier is provided from an antenna 136 to a primary serving cell, and one or more secondary component carriers are provided through one or more other antennas 136 for one or more secondary serving cells, at the same time. A primary serving cell is selected for a UE 102 during cell search by the UE 102. In some embodiments, secondary cell coverage is added and activated or deactivated by MAC layer 128 in response to signaling from RRC layer 125. For example, activation and deactivation of secondary component carriers may be managed through MAC control elements sent from the RRC layer 125 to the MAC layer 128. In some embodiments, deactivation of secondary component carriers by the MAC layer 128 may be time based.

As shown in FIG. 1A, in some embodiments the BBU 120 further implements the dynamic VoNR switch 107. The dynamic VoNR switch 107 works in conjunction with one or both of the RRC layer 125 and the MAC layer 128 to activate, deactivate, and/or reconfigure the current serving cell relationship configuration. The dynamic VoNR switch 107 may also dynamically compute carrier aggregation utilization statistics for current primary serving cell and secondary serving cell relationships. In some embodiments, when the primary cell performance is degraded with poor voice quality, radio quality, or data throughput with the dynamic VoNR switch 107 may adjust or reconfigure one or more parameters of the MAC layer 128 to implement a secondary cell in place of a poorly performing primary cell.

Figure 2:
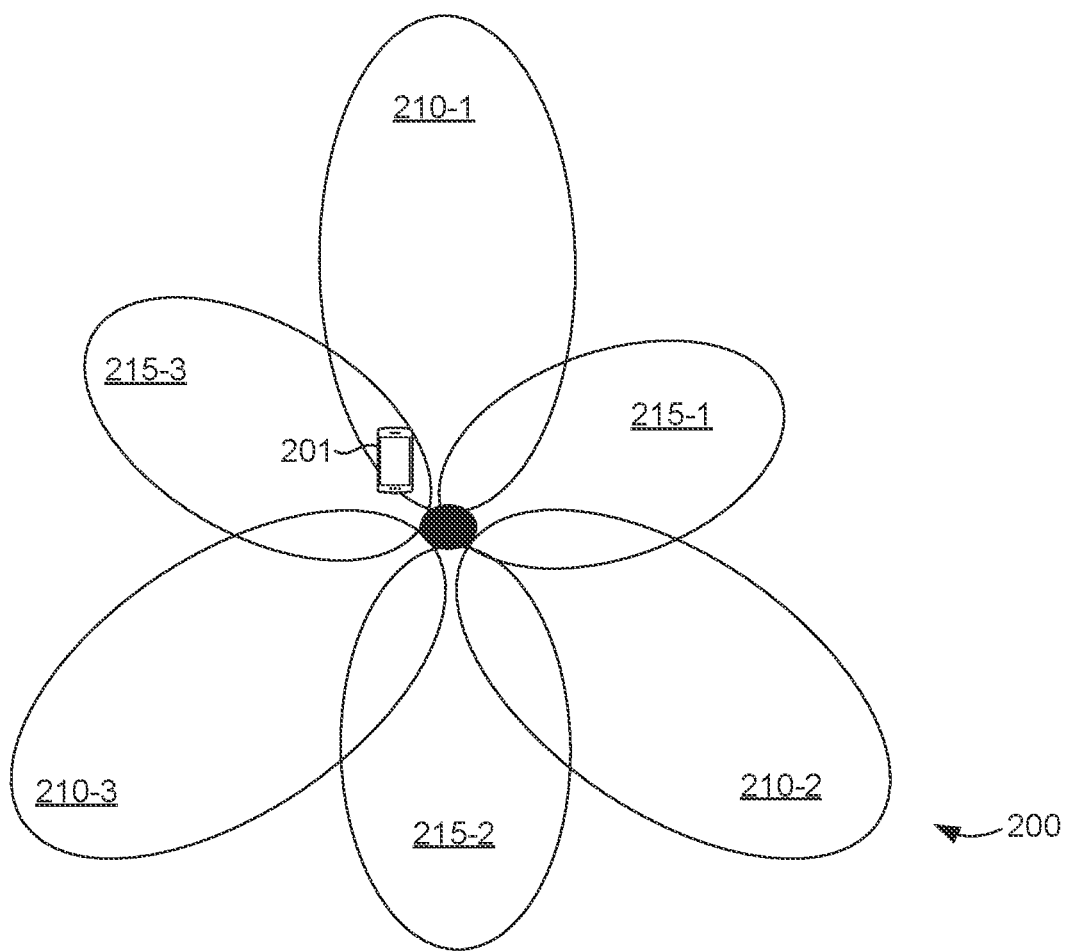
FIG. 2 is diagram illustrating an example of primary serving cell to secondary serving cell relationship reconfiguration according to an embodiment.

With reference to FIG. 2, an example of P-cell to S-cell relationship reconfiguration according to an embodiment is illustrated at 200. In this example, cells 210-1, 210-2 and 210-3 each operate at a first carrier frequency, $f_1$. The first carrier frequency, $f_1$, defines the primary component carrier so that that cells 210-1, 210-2 and 210-3 each function as primary serving cells. Cells 215-1, 215-2 and 215-3 each operate at a secondary carrier frequency, $f_2$. The secondary carrier frequency, $f_2$, defines the secondary component carrier so that cells 215-1, 215-2 and 215-3 each function as secondary serving cells. For the initial P-cell to S-cell relationship in this example, the MAC layer is configured to relate primary serving cell 210-1 with secondary serving cell 215-1, primary serving cell 210-2 with secondary serving cell 215-2, and primary serving cell 210-3 with secondary serving cell 215-3.

UE 201 is located within the geographic area of primary serving cell 210-1 and is configured to use UL and DL carrier aggregation. As shown in FIG. 2, UE 201 is also located within the geographic area of secondary serving cell 215-3, which overlaps with primary serving cell 210-1. UE 201 may be served by either primary serving cell 210-1 or secondary serving cell 215-3 as directed by dynamic VoNR switch 107. Primary serving cell 210-1 may utilize various combinations of frequencies and secondary serving cell 215-1 may utilize different combinations of frequencies, with some overlapping of frequency combinations between the primary serving cell 210-1 and the secondary serving cell 215-1.

Figure 3:
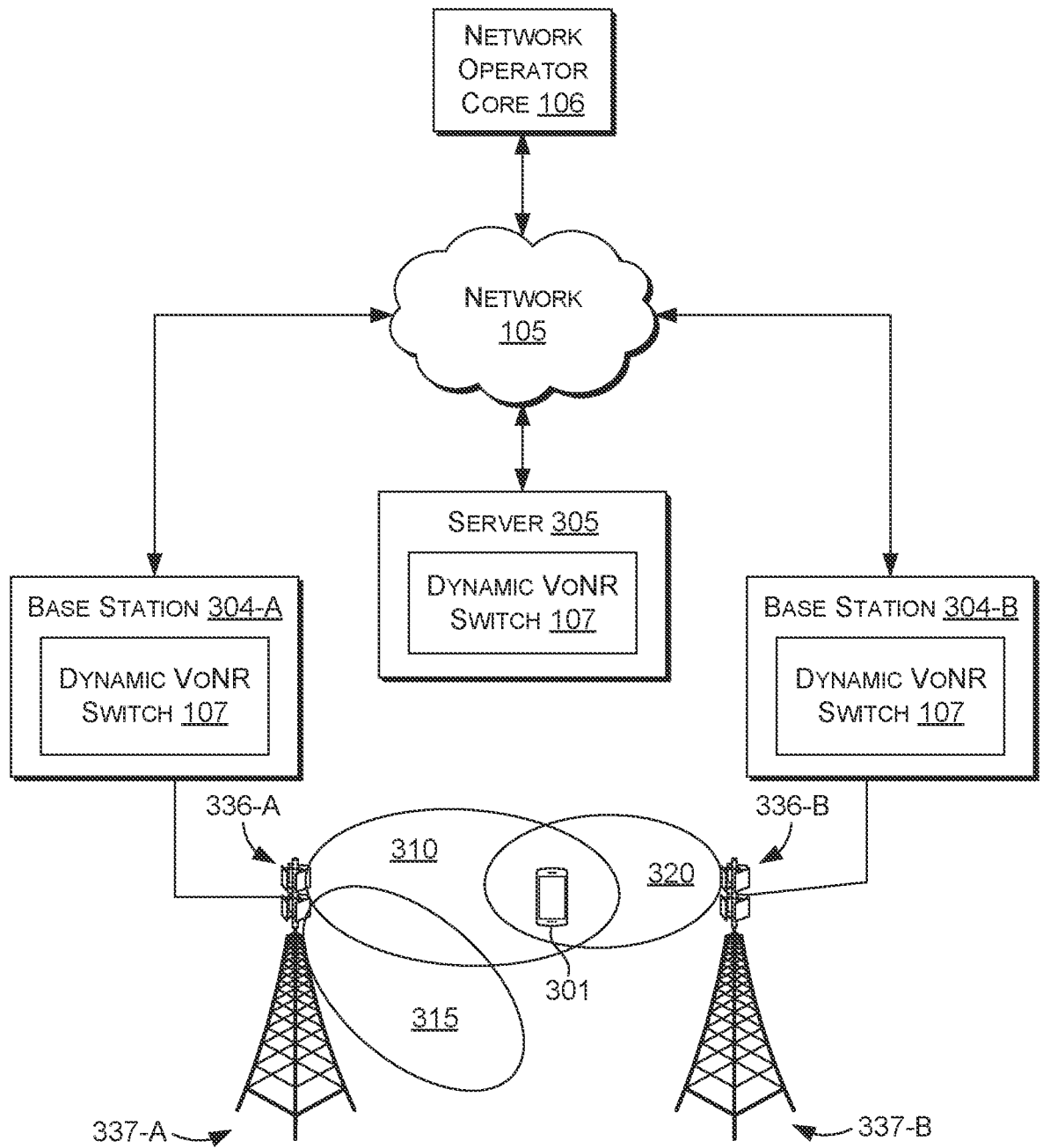
FIG. 3 is a diagram illustrating another example network environment according to an embodiment.

FIG. 3 illustrates an example embodiment of a network environment 300 (such as network environment 100 shown in FIG. 1) comprising a first base station 304-A and a second base station 304-B coupled to the network operator core 106 via network 105. In this example, base station 304-A is coupled to one or more antennas 336-A (which may be mounted to a site tower 337-A, for example). Base station 304-A forms at least one cell 310 that operates at a first carrier frequency, $f_1$, defining a primary component carrier. Cell 310 functions as a primary serving cell to at least one UE 301 within the geographic area of cell 310. Base station 304-A forms at least one other cell 315 that operates at a second carrier frequency, $f_2$. Cell 315 is configured by base station 304-A to relate to cell 310 for carrier aggregation purposes and therefore may function as a secondary serving cell for any UE that are located within the overlapping geographic regions of cell 310 and cell 315. Base station 304-B is coupled to one or more antennas 336-B (which may be mounted to a site tower 337-B, for example) and forms at least one cell 310 that operates at a third carrier frequency, $f_3$ (where the third carrier frequency, $f_3$, may be the same as, or different from, the second carrier frequency, $f_2$). For this embodiment, the dynamic VoNR switch 107 may be implemented in the base station 304-A for the primary serving sell 310, in a separate network node or server 305 coupled to the base station 304-A via a network (such as network 105, for example), or implemented in a distributed fashion between base station 304-A and server 305. In this example, the UE 301 is within the coverage area of base station 304-A and communicates with the network operator core 106 over the primary component carrier of primary serving cell 310.

Currently when a VoNR voice call is ongoing and active with both UL NRCA and DL NRCA and poor audio quality is observed, nothing is done and the UE waits until the radio quality is worse than an operator defined threshold. Radio quality may be measured by received signal received power (RSRP), reference signal received quality (RSRQ), or signal to interference and noise (SINR). Only after the radio quality degrades below the operator defined threshold is any action taken. At that point measurements of neighboring cells are made in an attempt to determine a replacement primary cell. Once a replacement primary cell is determined, the UE performs a handover to the best available replacement primary cell.

The embodiments discussed herein operate when a VoNR call is ongoing with active UL NRCA and DL NRCA. During the call poor audio quality is observed. Immediately the VoNR call is switched to one of the secondary cells with good RF conditions. Network operators may use predetermined thresholds to determine poor audio quality and may use RSRP, RSRQ, SINR, as well as time-based or duration RF quality or other metrics, such as mean opinion score (MOS) in making the determination. MOS is a numerical measure of the human-judged overall quality of a voice or video session.

Figure 4:
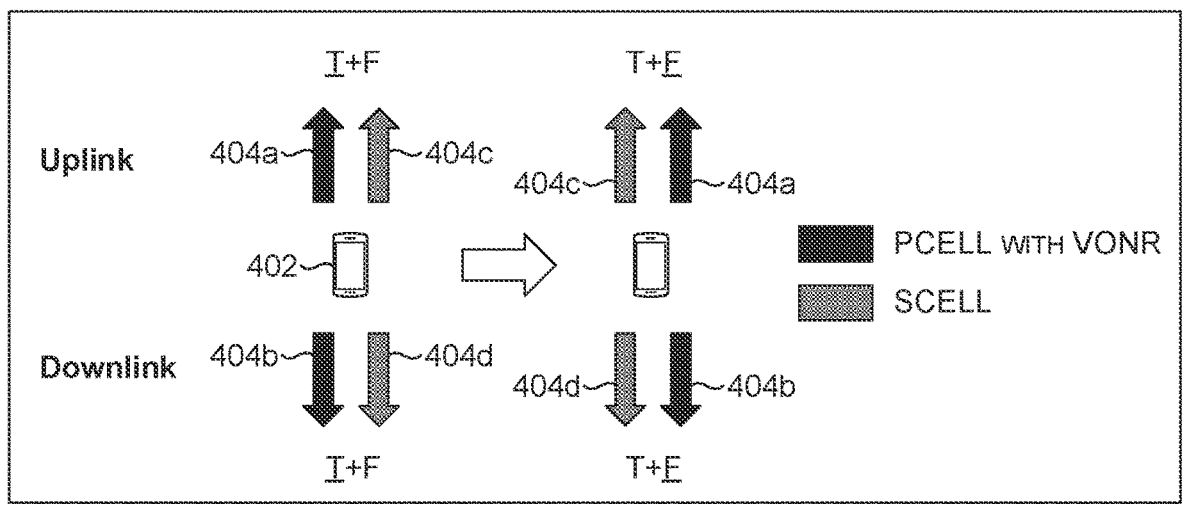
FIG. 4 is diagram illustrating an example of dynamic VoNR switching in an UL NRCA scenario, in accordance with some embodiments described herein.

FIG. 4 is diagram illustrating an example of dynamic VoNR switching in an UL NRCA scenario. UE 402 has an ongoing VoNR call with a primary cell. The VoNR call uses a TDD carrier, such as N2500, identified as T in FIG. 4. As shown in FIG. 4, UE 402 is in an ongoing VoNR call with UL NRCA 404a and 404c and DL NRCA 404b and 404d. The primary cell is depicted as black in FIG. 4. The secondary cell uses FDD identified as F in FIG. 4. The secondary cell is depicted as gray in FIG. 4. As the VoNR call proceeds the radio quality of the call degrades to the point that the predefined operator thresholds for poor voice quality are exceeded. The poor voice quality may also reflect poor radio quality. The predefined operator threshold metrics may also use packet loss, decline in bit rate, and internet packet loss measurements.

The dynamic VoNR switch 107 acts as soon as the predefined operator thresholds for poor radio quality are exceeded and directs the UE 402 to dynamically switch from the primary cell using UL 404a and DL 404b to secondary cell UL 404c and DL 404d. The primary cell UL 404a and DL 404b may have a smaller coverage area than the secondary cell. The VoNR call may include data, as both UL and DL are used because parallel data usage uses both UL and DL. The UE 402 switched to the secondary cell using UL 404c and DL 404d to continue the call. After the UE 402 is switched to the secondary cell E in FIG. 4. F indicates that the secondary cell has replaced the primary cell.

Figure 5:
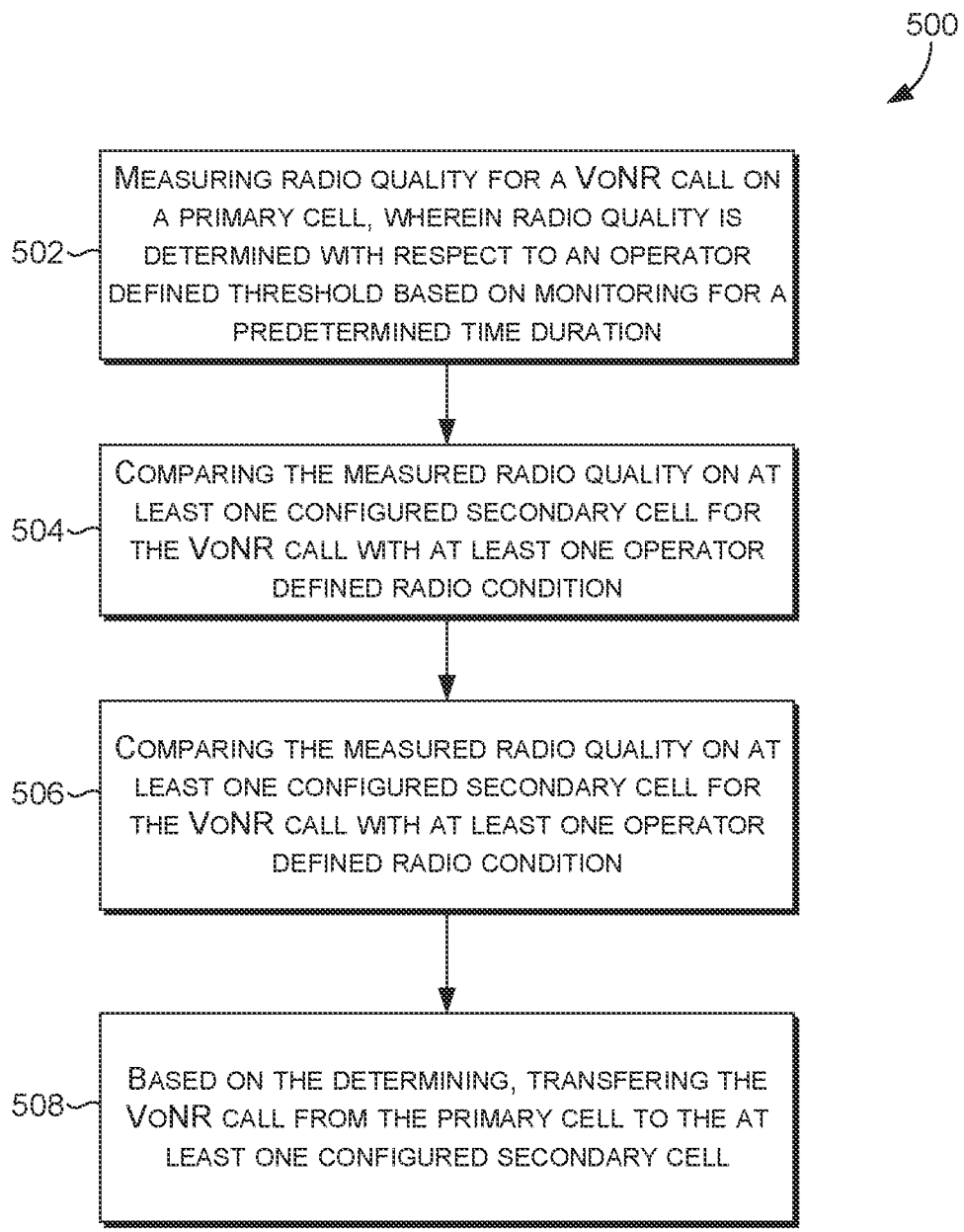
FIG. 5 is flow chart illustrating a method for dynamic VoNR switching in NRCA scenarios according to an embodiment.

FIG. 5 is flow chart illustrating a method for dynamic VoNR switching in NRCA scenarios. The method 500 begins at 502 with measuring radio quality for a VoNR call on a primary cell, wherein the radio quality is determined with respect to an operator defined threshold and is based on monitoring the VoNR call for a predetermined time duration. Then, at 504, a comparison between the measured radio quality on at least one configured secondary cell is made using at least one operator defined radio condition. At 506, the method continues with determining that the at least one configured secondary cell exceeds at least one operator defined radio condition. Then, based on the determining, at 508, the VoNR call is transferred from the primary cell to the at least one configured secondary cell.

The operator defined threshold may be a real-time transport (RTP) packet loss, which may be especially useful for radio calls, as RTP losses may occur before a user notices a degradation in radio quality. The configured secondary cell may be the same frequency in both uplink and downlink. It may be preferable that the UL and DL are equal. Signal quality and bandwidth may be measured using at least one of: RSRP, RSRQ, SINR, and MOP, however, other measurements may also be used. The bandwidth of both the primary and secondary cells may also be taken into account. All measurements of the radio quality of the VoNR call may be determined over a predetermined period of time, to prevent significant call degradation from continuing for a prolonged period.

Figure 6:
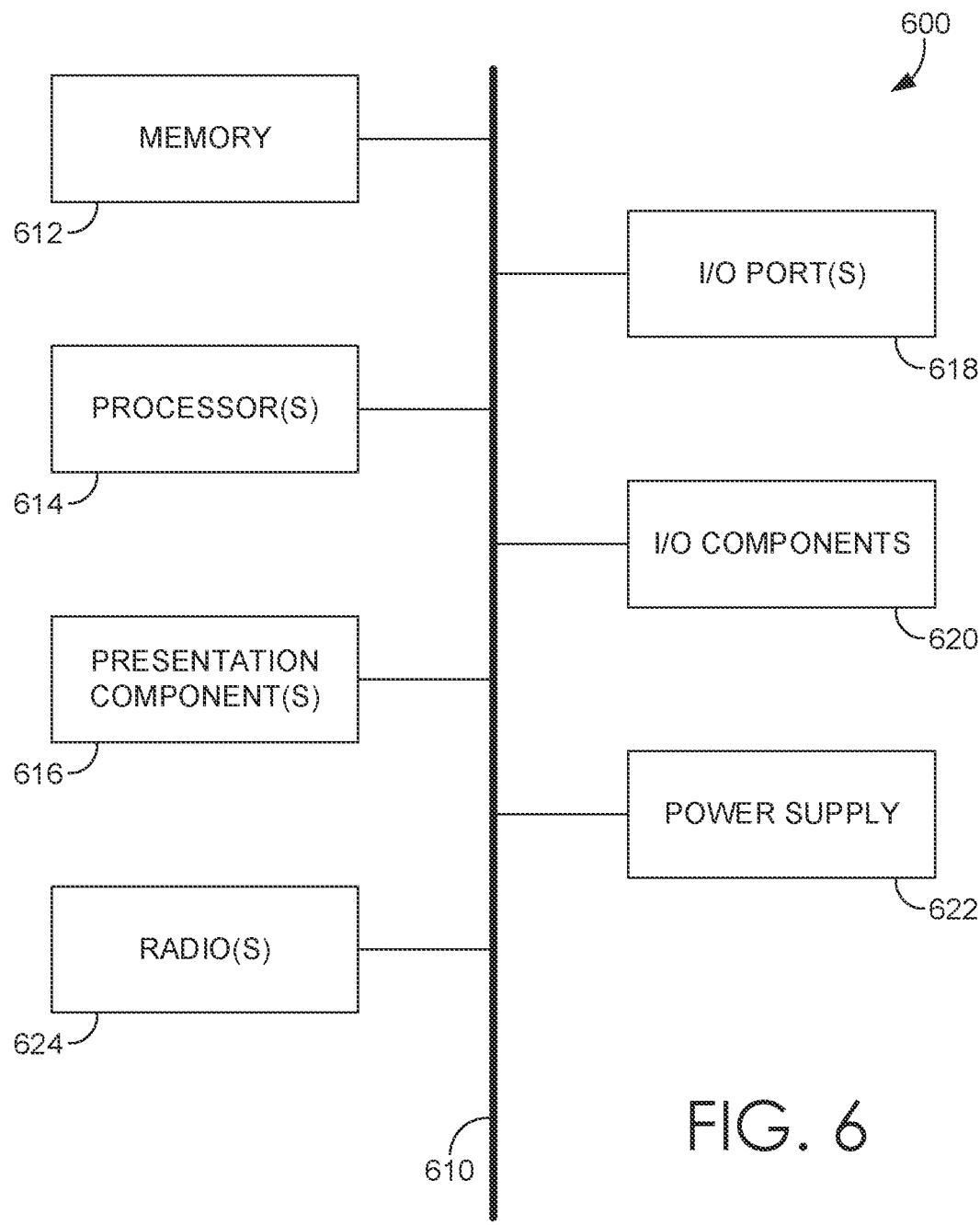
FIG. 6 is a diagram illustrating an example computing environment according to an embodiment.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output (I/O) ports 618, I/O components 620, power supply 622, and radio 624. Bus 610 represents what may be one or more busses (such as an address bus, data bus, or combination thereof). The devices of FIG. 6 are shown with lines for the sake of clarity. However, it should be understood that the functions performed by one or more components of the computing device 600 may be combined or distributed amongst the various components. For example, a presentation component such as a display device may be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device." In some embodiments, the carrier aggregation aware control logic as described in any of the examples of this disclosure may be implemented at least in part by code executed by the one or more processors(s) 614 and in some embodiments. In some embodiments, the one or more processors(s) 614 correspond to the one or more controllers 121 that execute the various functions of the BBU 120.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 may present data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, joystick, game pad, satellite dish, scanner, printer, wireless device, etc.

Radio(s) 624 represents a radio that facilitates communication with a wireless telecommunications network. Illustrative wireless telecommunications technologies include CDMA, GPRS, TDMA, GSM, and the like. Radio 624 might additionally or alternatively facilitate other types of wireless communications including Wi-Fi, WiMAX, LTE, or other VoIP communications. As can be appreciated, in various embodiments, radio(s) 624 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

In various alternative embodiments, system and/or device elements, method steps, or example implementations described throughout this disclosure (such as the base station, baseband unit (BBU), radio unit (RU), scheduler, dynamic VoNR switch, or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as base station, radio access network, network operator core, user equipment (UE), baseband unit (BBU), radio unit (RU), scheduler, CA-RCL function, network node, server, and other terms derived from these words refer to the names of elements that would be understood by one skilled in the art of wireless telecommunications and related industries as conveying structural elements, and are not used herein as nonce words or nonce terms for the purpose of invoking 35 U.S.C. 112(f). The terms "function", "unit", "node" and "module" may also be used to describe computer processing components and/or one or more computer executable services being executed on one or more computer processing components.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method of dynamic voice over new radio (VONR) switching in a network, the method comprising:
    measuring radio quality for a VoNR call on a primary cell, wherein radio quality is determined with respect to an operator defined threshold based on monitoring for a predetermined time duration;
    comparing the measured radio quality on at least one configured secondary cell for the VoNR call with at least one operator defined radio condition;
    determining that the at least one configured secondary cell exceeds at least one operator defined radio condition; and
    based on the determining, transferring the VoNR call from the primary cell to the at least one configured secondary cell, wherein the at least one configured secondary cell is already active for both uplink and downlink in an ongoing new radio carrier aggregation (NRCA) configuration, such that no additional cell search procedure for that secondary cell is required prior to the transfer.

2. The method of claim 1, wherein the operator defined threshold corresponds to a measurement of a real-time transport (RTP) packet loss.

3. The method of claim 2, wherein the RTP packet loss occurs in either an uplink (UL) direction, a downlink (DL) direction, or both directions.

4. The method of claim 1, wherein the configured secondary cell has the same frequency in both uplink and downlink.

5. The method of claim 1, wherein multiple configured secondary cells exceed the at least one operator defined radio condition.

6. The method of claim 5, further comprising comparing signal quality and bandwidth for the multiple configured secondary cells exceeding the at least one operator defined radio condition.

7. The method of claim 6, further comprising selecting, from the multiple configured secondary cells exceeding the at least one operator defined radio condition, the configured secondary cell with a highest value for the at least one operator defined radio condition from the multiple configured secondary cells exceeding the at least one operator defined radio condition.

8. The method of claim 1, wherein the at least one operator defined radio condition is a radio frequency signal condition.

9. The method of claim 8, wherein the radio frequency signal condition is at least one of: reference signal received power (RSRP), reference signal received quality (RSRQ), or signal to interference and noise (SINR).

10. The method of claim 1, wherein the at least one operator defined radio condition measurement is bandwidth.

11. The method of claim 1, wherein the at least one operator defined radio condition is measured over an operator defined period of time.

12. A method of dynamic voice over new radio (VONR) switching in a network, the method comprising:
   transmitting, by a user equipment (UE), a radio quality metric for a VoNR call on a primary cell, wherein radio quality is determined with respect to an operator defined threshold based on monitoring for a predetermined time duration; and
   receiving, by a UE, an instruction to transfer the VoNR call from a current primary cell to a configured secondary cell, wherein the configured secondary cell is already active for both uplink and downlink in an ongoing new radio carrier aggregation (NRCA) configuration, such that no additional cell search procedure for that secondary cell is required prior to the transfer.

13. The method of claim 12, wherein the operator defined threshold corresponds to a measurement of a real-time transport (RTP) packet loss.

14. The method of claim 13, wherein the RTP packet loss occurs in either an uplink direction (UL), a downlink direction (DL), or both directions.

15. The method of claim 12, wherein the configured secondary cell has the same frequency in both uplink and downlink.

16. A non-transitory computer storage media storing computer-useable instructions that, when used by one or more processors, cause the processors to:
   measure radio quality for a VoNR call on a primary cell, wherein radio quality is determined with respect to an operator defined threshold based on monitoring for a predetermined time duration;
   compare the measured radio quality on at least one configured secondary cell for the VoNR call with at least one operator defined radio condition;
   determine that the at least one configured secondary cell exceeds at least one operator defined radio condition measurement; and
   based on the determination, transferring the VoNR call the primary cell to the at least one configured secondary cell, wherein the at least one configured secondary cell is already active for both uplink and downlink in an ongoing new radio carrier aggregation (NRCA) configuration, such that no additional cell search procedure for that secondary cell is required prior to the transfer.

17. The non-transitory computer storage media of claim 16, wherein the operator defined threshold corresponds to a real-time transport (RTP) packet loss.

18. The non-transitory computer storage media of claim 17, wherein the RTP packet loss occurs in either an uplink (UL) direction, a downlink (DL) direction, or both directions.

19. The non-transitory computer storage media of claim 17, wherein the configured secondary cell has the same frequency in both uplink and downlink.

20. The non-transitory computer storage media of claim 16, wherein multiple configured secondary cells exceed at least one operator defined radio condition.

* * * * *